United States Patent [19]

Calundann et al.

[11] Patent Number: 4,522,974

[45] Date of Patent: Jun. 11, 1985

[54] MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY-4-BENZOYL MOIETY, 1,4-DIOXYPHENYLENE MOIETY, ISOPHTHALOYL MOIETY AND TEREPHTHALOYL MOIETY

[75] Inventors: Gordon W. Calundann, North Plainfield; Larry F. Charbonneau, Chatham; Brian C. Benicewicz, Cranford, all of N.J.

[73] Assignee: Celanese Corporation, New York, N.Y.

[21] Appl. No.: 492,103

[22] Filed: May 6, 1983

Related U.S. Application Data

[63] Continuation-in-part of Ser. No. 401,932, Jul. 26, 1982, abandoned.

[51] Int. Cl.$^3$ .............................................. C08G 63/60
[52] U.S. Cl. .................................... 524/605; 524/601; 524/604; 528/125; 528/128; 528/173; 528/190; 528/191; 528/193; 528/194; 528/271
[58] Field of Search .............. 528/125, 128, 173, 190, 528/191, 193, 194, 271; 524/601, 604, 605

[56] References Cited

U.S. PATENT DOCUMENTS

| | | | |
|---|---|---|---|
| 4,184,996 | 1/1980 | Calundann | 528/190 |
| 4,219,461 | 8/1980 | Calundann | 528/190 |
| 4,256,624 | 3/1981 | Calundann | 528/173 |
| 4,299,756 | 11/1981 | Calundann | 528/173 |
| 4,318,842 | 3/1982 | East et al. | 528/190 |
| 4,337,190 | 6/1982 | Calundann | 528/190 |
| 4,347,349 | 8/1982 | Siemionko | 528/190 |

*Primary Examiner*—Lester L. Lee
*Attorney, Agent, or Firm*—Burns, Doane, Swecker & Mathis

[57] ABSTRACT

The novel polyester of the present invention is capable of forming an anisotropic melt phase and may be prepared on a relatively economical basis. Such polyester includes a relatively low concentration of 6-oxy-2-naphthoyl moiety in combination with a more substantial concentration of 4-oxybenzoyl moiety. Other key moieties present are 1,4-dioxyphenylene moiety, isophthaloyl moiety and terephthaloyl moiety. The polyester has been found to be capable of undergoing melt extrusion to form quality high performance fibers, films, and three-dimensional shaped articles. The inclusion of terephthaloyl moiety has been found to enhance the modulus and strength of articles formed from the polyester as well as the hydrolytic stability of the same. Additionally, such articles can be subjected to higher use temperatures than if the terephthaloyl moiety were omitted.

22 Claims, No Drawings

MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY-4-BENZOYL MOIETY, 1,4-DIOXYPHENYLENE MOIETY, ISOPHTHALOYL MOIETY AND TEREPHTHALOYL MOIETY

CROSS-REFERENCE TO RELATED APPLICATION

This is a continuation-in-part of our U.S. Ser. No. 401,932, filed July 26, 1982 (now abandoned).

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromaic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols*), by G. Bier, Polymer, Vol. 15, Pages 527 to 535 (August 1974), (c) *Aromatic Polyester Plastics,* by S. G. Cottis, Modern Plastics, Pages 62 and 63 (July 1975), and (d) *Poly(p-Oxybenzoyl Systems): Homopolymer for Coatings: Copolymers for Compression and Injection Molding,* by Roger S. Storm and Steve G Cottis, Coatings Plast. Preprint, Vol. 34, No. 1, Pages 194 to 197 (April 1974). See also, U.S. Pat. Nos. 3,036,990; 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; and U.K. Patent Application No. 2,058,102A.

In U.S. Pat. No. 3,637,595 a relatively high melting polymer is disclosed which may comprise 4-oxybenzoyl moiety, dioxyaryl moiety (e.g. p,p'-dioxybiphenylene), and terephthaloyl moiety.

It has been disclosed that certain polyesters may be formed which exhibit melt anisotropy. See, for instance, (a) *Polyester X7G-A Self Reinforced Thermoplastic,* by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Pat. Nos. 828,935 and 828,936; (c) Dutch Pat. No. 7505551; (d) West German Pat. Nos. 2520819, 2520820, 2722120, 2834535, 2834536 and 2834537; (e) Japanese Pat. Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,284,757; 4,285,852; 4,287,332; 4,294,955; 4,299,756; 4,311,824; 4,314,073; 4,318,841; 4,318,842; 4,332,759; 4,333,907; 4,335,232; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,374,288; 4,375,350; and 4,377,681; (g) U.K. Application No. 2,002,404; (h) British Pat. No. 1,568,541; and (i) European Patent Application Nos. 24,499 and 45,499.

Representative disclosures of anisotropic melt forming polyesters, poly(ester-amides), or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,347,349; 4,351,917; 4,351,918; 4,355,133; 4,359,569; 4,362,777; 4,371,660; and 4,375,530.

In U.S. Pat. No. 4,219,461 a polyester is disclosed which comprises substantial concentrations of 6-oxy-2-naphthoyl and 4-oxybenzoyl moieties, and symmetrical dioxaryl and symmetrical dicarboxylaryl moieties. The 6-oxy-2-naphthoyl moieties are provided in a concentration of approximately 20 to 40 mole percent in all instances.

In U.S. Pat. No. 4,299,756 a polyester is disclosed which comprises 6-oxy-2-naphthoyl moiety, 3-phenyl-4-oxybenzoyl or 2-phenyl-4-oxybenzoyl moiety, 1,3-dioxyphenylene moiety, and terephthaloyl moiety.

In U.S. Pat. No. 4,318,841 a polyester is disclosed which comprises 6-oxy-2-naphthoyl moiety, 4-oxybenzoyl moiety, the non-symmetrical 1,3-dioxyphenylene moiety, and terephthaloyl moiety.

In U.S. Pat. No. 4,370,466 a polyester is disclosed which comprises about 2.5 to 15 mole percent of 6-oxy-2-naphthoyl moiety, about 40 to 70 mole percent of 4-oxybenzoyl moiety, at least about 10 mole percent of 1,3-dioxyphenylene moiety, and at least 10 mole percent of isophthaloyl moiety. The possible inclusion of a terephthaloyl moiety and the advantageous property enhancement resulting from the presence of such moiety in combination with the other moieties are not identified.

It is an object of the present invention to provide a novel melt processable polyester which forms a highly tractable anisotropic melt phase.

It is an object of the present invention to provide a novel melt processable polyester which forms an anisotropic melt phase and which has been found to be capable of melt extrusion to form quality high performance fibers, films, three-dimensional molded articles, etc.

It is an object of the present invention to provide a novel melt processable polyester which forms a melt phase below approximately 400° C. in the substantial absence of polymer degradation unlike many polymers which include a relatively high concentration of 4-oxybenzoyl moiety.

It is another object of the present invention to provide a novel melt processable polyester which can commonly be prepared on a more economical basis than that claimed in U.S. Pat. No. 4,219,461 since it includes 6-oxy-2-naphthoyl moiety in a relatively low concentration.

It is a further object of the present invention to provide a novel melt processable polyester which commonly exhibits enhanced strength, modulus, and hydrolytic stability properties when compared with the polyester of U.S. Pat. No. 4,370,466 which is totally lacking in terephthaloyl moiety.

These and other objects, as well as the scope, nature and utilization of the invention will be apparent to those skilled in the art from the following detailed description.

SUMMARY OF THE INVENTION

It has been found that a melt processable polyester capable of forming an anisotropic melt phase at a temperature below approximately 400° C. consists essentially of the recurring moieties I, II, III, and IV wherein:

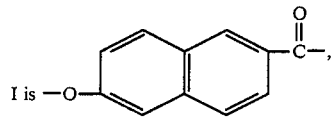

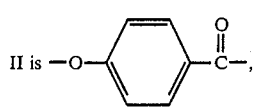

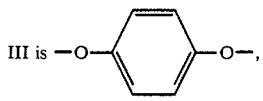

where the aromatic ring optionally may include substitution of at least some of the hydrogen atoms present therein selected from the group consisting of an alkyl group of 1 to 4 carbon atoms, an alkoxy group of 1 to 4 carbon atoms, halogen, phenyl, and mixtures of the foregoing, and

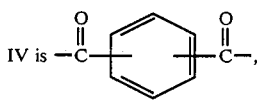

where the aromatic ring optionally may include substitution of at least some of the hydrogen atoms present thereon selected from the group consisting of an alkyl group of 1 to 4 carbon atoms, an alkoxy group of 1 to 4 carbon atoms, halogen, phenyl, and mixtures of the foregoing, and wherein approximately 40 to 90 mole percent of moiety IV is isophthaloyl moiety and approximately 10 to 60 mole percent of moiety IV is terephthaloyl moiety, and wherein the polyester comprises approximately 3 to 15 mole percent of moiety I, approximately 20 to 70 mole percent of moiethy II, approximately 7.5 to 38.5 mole percent of moiety III, and approximately 7.5 to 38.5 mole percent of moiety IV.

DESCRIPTION OF PREFERRED EMBODIMENTS

The melt processable polyester of the present invention consists essentially of at least five recurring units (i.e., moieties I, II, III, and IV which consists of two components) which when combined in the polyester have been found to form an atypical highly tractable anisotropic melt phase at a temperature below approximately 400° C., and preferably below approximately 370° C. (e.g., below approximately 350° C. in a particularly preferred embodiment). The polymer melting temperature may be confirmed by the use of a differential scanning calorimeter (i.e., DSC) employing repeat scans at a 20° C. per minute heat-up rate and observing the peak of the DSC melt transition. The polyester of the present invention may be considered crystalline in the sense that fibers melt extruded therefrom exhibit X-ray diffraction patterns using Ni-filtered CuKα radiation and flat plate cameras characteristic of polymeric crystalline materials. Because of its ability also to exhibit anisotropic properties (i.e., liquid crystalline properties) in the melt, the polyester readily can form a product having a highly oriented molecular structure upon melt processing. Preferred polyesters are capable of undergoing melt processing at a temperature in the range of approximately 320° to 390° C. (e.g., at approximately 345° to 360° C.). The usual difficulties incurred when one attempts to melt process many aromatic polyesters by conventional melt processing techniques effectively are eliminated.

The first essential unit (i.e., moiety I) of the polyester of the present invention is a 6-oxy-2-naphthoyl moiety of the structure formula:

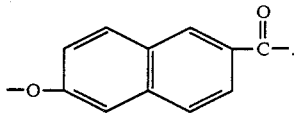

Such moiety is free of aromatic ring substitution and is present in a relatively low concentration as discussed hereafter.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of betanaphthol. Additionally, see U.S. Pat. Nos. 4,287,357; 4,329,424; 4,345,094; and 4,345,095.

Moiety I comprises approximately 3 to 15 mole percent of the polyester. In a preferred embodiment moiety I is present in a concentration of approximately 5 to 10 mole percent (e.g., approximately 5 or 10 mole percent).

The presence of moiety I in the polyester of the present invention even in such low concentrations has been found to lower the melting or softening temperature of the resulting polyester to a controlled degree while still contributing to the liquid crystallinity of the same, thereby making possible the use of more conventional melt extrusion equipment and processing conditions than would otherwise be required. Such controlled lowering of the melting temperature in the polyester of the present invention is accomplished in combination with the ability to form a highly tractable anisotropic melt. Moiety I while significantly contributing to the properties of the resulting polyester does not contribute substantially to the overall cost for producing such polyester in view of its relatively low concentration.

The second essential moiety (i.e., moiety II) of the polyester of the present invention is a 4-oxybenzoyl moiety of the structural formula:

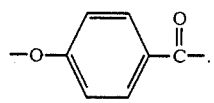

Such moiety is free of ring substitution and is present in a substantial concentration. Moiety II may be derived from unsubstituted p-hydroxybenzoic acid or its derivatives. Moiety II is present in a concentration of 20 to 70 mole percent. In a preferred embodiment moiety II is present in a concentration of approximately 50 to 65 mole percent (e.g., 50 to 60 mole percent).

The third essential moiety (i.e., moiety III) of the polyester of the present invention is a symmetrical dioxyaryl moiety of the formula:

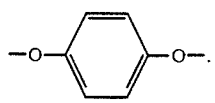

Moiety III conveniently may be derived from hydroquinone or its derivatives, and may be termed a 1,4-dioxyphenylene moiety.

Moiety III optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing. If the optional substitution of moiety III is a phenyl group which itself is substituted, the substituents present on such phenyl group may be an alkyl group of 1 to 4 carbon atoms, an alkoxy group of 1 to 4 carbon atoms, halogen, phenyl, and mixtures of these. In a preferred embodiment moiety III is free of ring substitution and the concomitant expense associated therewith.

Moiety III is present in the polyester of the present invention in a concentration of approximately 7.5 to 38.5 mole percent, and preferably in a concentration of approximately 12.5 to 22.5 mole percent (e.g., approximately 17.5 or 20 mole percent).

The fourth essential moiety (i.e., moiety IV) consists of two different units of the formula:

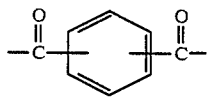

which are isophthaloyl moiety and terephthaloyl moiety. The isophthaloyl moiety possesses the formula

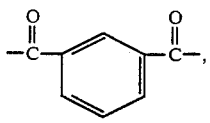

and the terephthaloyl moiety possesses the formula

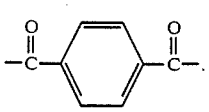

Moiety IV conveniently may be derived from isophthalic acid (or its derivatives) and terephthalic acid (or its derivatives) in the relative concentrations indicated below.

Moiety IV optionally may include substitution of at least some of the hydrogen atoms present upon the aromatic ring selected from the group consisting of an alkyl group of 1 to 4 carbon atoms, an alkoxy group of 1 to 4 carbon atoms, halogen, phenyl, and mixtures of the foregoing. If the optional substitution of moiety IV is a phenyl group which itself is substituted, the substituents present on such phenyl group may be an alkyl group of 1 to 4 carbon atoms, an alkoxy group of 1 to 4 carbon atoms, halogen, phenyl, and mixtures of these. In a preferred embodiment moiety IV is free of ring substitution and the concomitant expense associated therewith.

Moiety IV consists of approximately 40 to 90 mole percent of isophthaloyl moiety and approximately 10 to 60 mole percent of terephthaloyl moiety. In a preferred embodiment moiety IV consists of approximately 50 to 75 mole percent (e.g., approximately 50 mole percent) of isophthaloyl moiety and approximately 25 to 50 mole percent (e.g., approximately 50 mole percent) of terephthaloyl moiety.

It has been found that the presence of the terephthaloyl moiety in the resulting polyester enhances the modulus and strength of articles formed from the polyester as well as the hydrolytic stability of the same. Additionally, such articles can be subjected to higher use temperatures than if the terephthaloyl moiety were omitted and replaced solely by isophthaloyl moiety.

Moiety IV is present in the polyester of the present invention in a concentration of approximately 7.5 to 38.5 mole percent, and preferably in a concentration of approximately 12.5 to 22.5 mole percent (e.g., approximately 17.5 or 20 mole percent).

Other ester-forming moieties (e.g., dioxy units, dicarboxy units and/or other combined oxy and carboxy units) than those specified for moieties I, II, III and IV additionally may be included in the polyester of the present invention in a minor concentration. Representative additional ester-forming moieties may be derived from substituted hydroxynaphthoic acid, m-hydroxylbenzoic acid, substituted hydroxybenzoic acids, cycloaliphatic dicarboxylic acids, etc. Amide-forming moieties also may be included in the polyester of the present invention in a minor concentration. Representative reactants which may form such amide-forming moieties include m-aminophenol, p-aminophenol, m-aminobenzoic acid, p-aminobenzoic acid, m-phenylenediamine, p-phenylenediamine, etc. The additional ester-forming moieties and/or amide-forming moieties optionally may be included in the polyester of the present invention so long as such moieties do not raise the melting temperature of the resulting polymer above that specified, or do not otherwise interfere with the exhibition of the desired anisotropic properties in the melt. The total minor concentration of such additional ester-forming and amide-forming moieties if present generally will be less than 10 mole percent of the total polymer.

The polyester of the present invention is preferably "wholly aromatic" in the sense that each moiety present contributes at least one aromatic ring to the main polymer chain.

The polyester of the present invention commonly exhibits

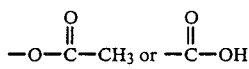

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

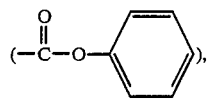

and methylester

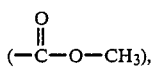

optionally may be included at the ned of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyester of the present invention commonly exhibits a weight average molecular weight of about 2,000 to 200,000, and preferably about 10,000 to 50,000 (e.g., about 20,000 to 25,000). Such molecular weight may be determined by standard techniques not involving the solutioning of the polymer (e.g., by end group determination via infra red spectroscopy on compression molded films). Alternatively, light scattering techniques in a pentafluorophenol solution may be employed to determine the molecular weight.

The polyester prior to heat treatment additionally commonly exhibits an inherent viscosity (i.e., I.V.) of at least 0.6, and preferably at least 1.0 (e.g., approximately 2 to 8 or more) when dissolved in a concentration of 0.1 percent by weight in pentafluorophenol at 60° C. Alternatively, the inherent viscosity of the polyester may be determined while dissolved in a 1:1 solution of pentafluorophenol:hexafluoroisopropanol in a concentration of 0.1 percent (W/V) at 25° C. This alternate technique offers the possibility of automation while operating at room temperature; however, it tends to yield numerical values which are higher than those obtained with a 0.1 percent solution in pentafluorophenol at 60° C. For instance, such values with the mixed solvent may be on the order of approximately 10 percent higher than those obtained with pentafluorophenol at 60° C.

Unlike the aromatic polyesters commonly encountered in much of the prior art, the polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow); however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a largely melt solution of the reactants wherein some reactants such as terephthalic acid initially are present to some degree as solids. Low levels of terephthalic acid may dissolve under such circumstances. The polymer product sometimes is suspended therein as solid polymer particles. A vacuum may be applied to facilitate removal of volatiles formed during the final stage of the condensation (e.g., acetic acid or water) and to otherwise expedite the polymerization.

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, and III are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I, II, and III are provided. Accordingly, particularly preferred reactants for the condensation reaction are 6-acetoxy-2-naphthoic acid, 4-acetoxy-benzoiz acid, and hydroquinone diacetate.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 by weight.

The molecular weight of a previously formed polyester may be further increased via a solid state polymerization procedure wherein the particulate polymer is heated in an inert atmosphere (e.g., in a nitrogen atmosphere) at a temperature of about 240° C. for 10 to 12 hours.

The polyester of the present invention readily can be melt processed in the substantial absence of polymer degradation to form a variety of relatively stiff shaped articles (e.g., molded three-dimensional articles, fibers, films, tapes, etc.). The polyester of the present invention is suited for molding applications and may be molded via standard injection molding techniques commonly utilized when forming molded articles. Unlike the polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent by weight of a solid filler (e.g., talc) and/or reinforcing agent (e.g., glass fibers).

The polyester of the present invention also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret containing 1 to 200 holes (e.g., 6 to 1500 holes) such as commonly used in the melt spinning of polyethylene terephthalate, having a diameter of about 1 to 70 mils (e.g., 5 to 40 mils) may be utilized. Yarns of about 20 to 200 continuous filaments are commonly formed. The melt-spinnable polyester is supplied to the extrusion orifice at a temperature above its melting point (e.g., at a temperature of about 320° to 390° C.), and at a temperature of about 345° to 360° C. in a preferred embodiment.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier filament of about 1 to 20.

The resulting filamentary material or film optionally may be subjected to a thermal treatment whereby its physical properties are further enhanced. The tenacity of the fiber or film may be increased by such thermal treatment. More specifically, the fibers or films may be thermally treated in an inert atmosphere (e.g., nitrogen, argon, helium) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 270° C. for 8 hours and at 280° C. for 15 hours. Alternatively, the fiber may be heated at about 15° to 20° C. below the temperature at which it melts for about 24 hours. Optimum heat treatment conditions will vary with the specific composition of the polyester and with the fiber's process history.

The as-spun fibers formed from the polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and an average single filament tensile modulus or initial modulus of at least about 300 grams per denier (e.g., about 300 to 1,000 grams per denier, and preferably at least 400 or 500 or more grams per denier). Such properties are further enhanced by thermal treatment as previously indicated and enable the fibers to be used with particular advantage as tire cords and in other industrial applications, such as conveyor belts, hose, cabling, resin reinforcement, etc. Following heat treatment the fibers in preferred embodiments exhibit a tensile modulus or initial modulus of at least 500 grams per denier and most preferably at least 600 grams per denier. Films formed of the polyester of the present invention may be used as strapping tape, cable wrap, magnetic tape, electric motor dielectric film, etc. The fibers and films exhibit an inherent resistance to burning and a good retention of properties at elevated temperatures.

The following examples are presented as specific illustrations of the claimed invention. It should be understood, however, that the invention is not limited to the specific details set forth in the examples.

EXAMPLE 1

To a 300 ml. three-neck round bottom flask equipped with a sealed paddle stirrer, gas inlet tube, and a distillation head connected to a condenser were added the following:

(a) 11.51 grams of 6-acetoxy-2-naphthoic acid (0.05 mole);
(b) 49.54 grams of 4-acetoxybenzoic acid (0.275 mole);
(c) 16.99 grams of hydroquinone diacetate (0.0875 mole);
(d) 7.27 grams of isophthalic acid (0.04375 mole);
(e) 7.27 grams of terephthalic acid (0.04375 mole; and
(f) 0.0046 gram of potassium acetate catalyst.

The flask was thoroughly purged of oxygen by evacuation and refilling with dry argon three times, and was heated in a fluidized sand bath under a slow stream of argon.

The contents of the flask were initially heated to 240° C. over a period of one hour, from 240° to 300° C. over a period of two hours, from 300° to 360° C. over a period of one hour, and were finally evacuated to 0.1 Torr at 360° C. for 15 minutes. The vacuum was released with dry argon, and the contents of the flask were allowed to cool.

The inherent viscosity (I.V.) of the polymer was approximately 4.93 as determined in pentafluorophenol solution of 0.1 percent by weight concentration at 60° C. in accordance with the equation $$\text{I.V.} = \frac{\ln(\eta\,\text{rel})}{c}$$

where c = concentration of solution (0.1 percent by weight), and $\eta$ rel = relative viscosity. When the polymer was subjected to differential scanning calorimetry (20° C./min. heating rate), it exhibited a second order glass transition temperature at 110° C. and a slight melt endotherm at 310° C. The polymer melt was optically anisotropic.

The powdered polymer was dried in a vacuum oven, and while molten and at a temperature of 360° C. was extruded through single hole spinneret (0.127 mm. diameter×0.178 mm.) at a throughput rate of 0.42 gram/minute. The as-spun filament was quenched in ambient air (i.e. at 72° F. and 65 percent relative humidity) prior to windup at a speed of 1234 meters/minute.

A section of the resulting as-spun polyester fiber had a denier of 3.5 and exhibited the following average single filament properties:
  Tenacity (grams per denier): 7.2
  Initial modulus (grams per denier): 479
  Elongation (percent): 1.8
Following thermal treatment in a dry nitrogen flow at 280° C. for 15 hours the fiber exhibited the following average single filament properties
  Tenacity (grams per denier) 17.1
  Initial modulus (grams per denier) 514
  Elongation (percent) 3.3

The physical properties were determined in accordance with the standard ASTM testing procedure D3822.

EXAMPLE 2

To a 300 ml. three-neck round bottom flask equipped with a sealed paddle stirrer, gas inlet tube, and a distillation head connected to a condenser were added the following:
(a) 6.9 grams of 6-acetoxy-2-naphthoic acid (0.03 mole),
(b) 54.1 grams of 4-acetoxybenzoic acid (0.30 mole),
(c) 16.5 grams of hydroquinone diacetate (0.085 mole),
(d) 7.1 grams of isophthalic acid (0.0425 mole),
(e) 7.1 grams of terephthalic acid (0.0425 mole), and
(f) 0.005 gram of potassium acetate catalyst.

The reaction flask was thoroughly purged three times with nitrogen. The contents of the flask were initially heated to 240° C., from 240° to 300° C. over a period of two hours, and from 300° to 360° C. over a period of one hour while being purged with nitrogen at a flow rate of 25 ml. per minute. When a temperature of 360° C. was reached, the flask was evacuated to 0.55 Torr for 15 minutes. The vacuum was released with nitrogen, and the contents of the flask were allowed to cool.

The inherent viscosity (I.V.) of the polymer was approximately 2.61 as determined in a 1:1 pentafluorophenol: hexafluoroisopropanol solution of 0.1 percent (W/V) concentration at 25° C. when utilizing a Schott automatic viscometer. When the polymer was subjected to differential scanning calorimetry (20° C./min. heating rate), it exhibited endotherm peaks at 335° C. and 372° C. The polymer melt was optically anisotropic.

The remaining polymer was dried at 130° C. for two days and while molten and at a temperature of 390° C. was extruded through a single hole spinneret (0.005 inch diameter×0.007 inch) at a throughput rate of 0.42 gram/minute. The as-spun filament was quenched in ambient air (i.e., at 72° F. and 65 percent relative humidity) prior to windup at a speed of 1500 meters/minute.

A section of the resulting as-spun polyester fiber had a denier of 2.9 and exhibited the following average single filament properties:
  Tenacity (grams per denier): 6.0
  Initial modulus (grams per denier): 590
  Elongation (percent): 1.2

Following heat treatment in a nitrogen atmosphere having a flow rate of 2 liters/minute at 270° C. for 8 hours the fiber exhibited the following average single filament properties:
  Tenacity (grams per denier): 16.4
  Initial modulus (grams per denier): 680
  Elongation (percent): 2.54

EXAMPLE 3

Example 2 was substantially repeated with the exceptions indicated. The following chemicals were added to the flask:
(a) 13.8 grams of 6-acetoxy-2-naphthoic acid (0.06 mole),
(b) 99.1 grams of 4-acetoxybenzoic acid (0.55 mole),
(c) 37.9 grams of hydroquinone diacetate (0.195 mole),
(d) 24.3 grams of isophthalic acid (0.14625 mole),
(e) 8.1 grams of terephthalic acid (0.04875 mole), and
(f) 0.023 gram of 4-dimethylaminopyridine catalyst.

The resulting polymer exhibited an inherent viscosity as determined in Example 2 of 2.15, and a glass transition temperature at 100° C. Monofilaments were spun while the molten polymer was at a temperature of 345° C. while employing a windup speed of 1159 meters/minute.

A section of the resulting as-spun polyester fiber had a denier of 3.3 and exhibited the following average single filament properties:
  Tenacity (grams per denier): 6.8
  Initial modulus (grams per denier): 470
  Elongation (percent): 1.8
Following heat-treatment in the nitrogen atmosphere at 270° C. for 8 hours the fiber exhibited the following average single filament properties:
  Tenacity (grams per denier): 17.9
  Initial modulus (grams per denier): 484
  Elongation (percent): 3.84

EXAMPLE 4

Example 2 was substantially repeated with the exceptions indicated. The following chemicals were added to the flask:
(a) 13.9 grams of 6-acetoxy-2-naphthoic acid (0.06 mole),
(b) 81.1 grams of 4-acetoxybenzoic acid (0.45 mole),
(c) 47.6 grams of hydroquinone diacetate (0.245 mole),
(d) 20.4 grams of isophthalic acid (0.1225 mole),
(e) 20.4 grams of terephthalic acid (0.1225 mole), and
(f) 0.009 gram of potassium acetate catalyst, and
(g) 0.009 gram of titanium potassium oxalate catalyst.

The resulting polymer exhibited an inherent viscosity as determined in Example 2 of 2.49, and a differential scanning calorimetry melt endotherm peak at 328° C. Monofilaments were spun while the molten polymer was at a temperature of 360° C. while employing a windup speed of 1799 meters/minute.

A section of the resulting as-spun polyester fiber had a denier of 2.3 and exhibited the following average single filament properties:
  Tenacity (grams per denier): 6.1
  Initial modulus (grams per denier): 480
  Elongation (percent): 1.4
Following heat-treatment in the nitrogen atmosphere at 270° C. for 8 hours the fiber exhibited the following average single filament properties:
  Tenacity (grams per denier): 18.8
  Initial modulus (grams per denier): 575
  Elongation (percent): 3.58

EXAMPLE 5

Example 2 was substantially repeated with the exceptions indicated. The following chemicals were added to the flask:
(a) 11.5 grams of 6-acetoxy-2-naphthoic acid (0.05 mole),
(b) 108.1 grams of 4-acetoxybenzoic acid (0.60 mole),
(c) 34.0 grams of hydroquinone diacetate (0.175 mole),
(d) 14.5 grams of isophthalic acid (0.0875 mole),
(e) 14.5 grams of terephthalic acid (0.0875 mole), and
(f) 0.009 gram of potassium acetate catalyst.

The resulting polymer exhibited an inherent viscosity as determined in Example 2 of 2.35, and differential scanning calorimetry melt endotherm peaks at 335° C. and 385° C. Monofilaments were spun while the molten polymer was at a temperature of 390° C. while employing a windup speed of 1074 meters/minute.

A section of the resulting as-spun polyester fiber had a denier of 3.5 and exhibited the following average single filament properties:
Tenacity (grams per denier): 3.5
Initial modulus (grams per denier): 513
Elongation (percent): 0.75
Following heat-treatment in the nitrogen atmosphere at 290° C. for 8 hours the fiber exhibited the following average single filament properties:
Tenacity (grams per denier): 13.4
Initial modulus (grams per denier): 661
Elongation (percent): 2.02

EXAMPLE 6

Example 2 was substantially repeated with the exceptions indicated. The following chemicals were added to the flask:
(a) 11.5 grams of 6-acetoxy-2-naphthoic acid (0.05 mole),
(b) 81.1 grams of 4-acetoxybenzoic acid (0.45 mole),
(c) 48.6 grams of hydroquinone diacetate (0.25 mole),
(d) 20.8 grams of isophthalic acid (0.125 mole),
(e) 20.8 grams of terephthalic acid (0.125 mole), and
(f) 0.009 gram of potassium acetate catalyst.

The resulting polymer exhibited an inherent viscosity as determined in Example 2 of 3.47, and differential scanning calorimetry melt endotherm peaks at 335° C. and 375° C. Monofilaments were spun while the molten polymer was at a temperature of 375° C. while employing a windup speed of 919 meters/minute.

A section of the resulting as-spun polyester fiber had a denier of 4.6 and exhibited the following average single filament properties:
Tenacity (grams per denier): 5.8
Initial modulus (grams per denier): 500
Elongation (percent): 1.35
Following heat-treatment in the nitrogen atmosphere at 280° C. for 15 hours the fiber exhibited the following average single filament properties:
Tenacity (grams per denier): 14.7
Initial modulus (grams per denier): 694
Elongation (percent): 2.25

EXAMPLE 7

Example 2 was substantially repeated with the exceptions indicated. The following chemicals were added to the flask:
(a) 11.5 grams of 6-acetoxy-2-naphthoic acid (0.05 mole),
(b) 72.1 grams of 4-acetoxybenzoic acid (0.40 mole),
(c) 53.4 grams of hydroquinone diacetate (0.275 mole),
(d) 34.2 grams of isophthalic acid (0.20625 mole),
(e) 11.4 grams of terephthalic acid (0.06875 mole), and
(f) 0.023 gram of 4-dimethylaminopyridine catalyst.

The resulting polymer exhibited an inherent viscosity as determined in Example 2 of 1.6, and a differential scanning calorimetry melt endotherm peak at 265° C. Monofilaments were spun while the molten polymer was at a temperature of 315° C. while employing a windup speed of 2658 meters/minute.

A section of the resulting as-spun polyester fiber had a denier of 1.6 and exhibited the following average single filament properties:
Tenacity (grams per denier): 5.1
Initial modulus (grams per denier): 350
Elongation (percent): 2.1
Following heat-treatment in the nitrogen atmosphere at 270° C. for 8 hours the fiber exhibited the following average single filament properties:
Tenacity (grams per denier): 14.9
Initial modulus (grams per denier): 357
Elongation (percent): 4.29

EXAMPLE 8

Example 2 was substantially repeated with the exceptions indicated. The following chemicals were added to the flask:
(a) 4.6 grams of 6-acetoxy-2-naphthoic acid (0.02 mole),
(b) 36.1 grams of 4-acetoxybenzoic acid (0.20 mole),
(c) 11.7 grams of hydroquinone diacetate (0.14 mole),
(d) 11.6 grams of isophthalic acid (0.07 mole),
(e) 11.6 grams of terephthalic acid (0.07 mole), and
(f) 0.005 gram of potassium acetate catalyst.

The resulting polymer exhibited an inherent viscosity as determined in Example 2 of 1.98, and differential scanning calorimetry endotherm peaks at 332° C. and 350° C. Monofilaments were spun while the molten polymer was at a temperature of 390° C. while employing a windup speed of 810 meters/minute.

A section of the resulting as-spun polyester fiber had a denier of 4.0 and exhibited the following average single filament properties:
Tenacity (grams per denier): 4.6
Initial modulus (grams per denier): 500
Elongation (percent): 1.1

EXAMPLE 9

Example 2 was substantially repeated with the exceptions indicated. The following chemicals were added to the flask:
(a) 4.6 grams of 6-acetoxy-2-naphthoic acid (0.02 mole),
(b) 27.1 grams of 4-acetoxybenzoic acid (0.15 mole),
(c) 32.1 grams of hydroquinone diacetate (0.165 mole),
(d) 13.8 grams of isophthalic acid (0.082 mole),
(e) 13.8 grams of terephthalic acid (0.082 mole), and
(f) 0.005 gram of potassium acetate catalyst.

The resulting polymer exhibited an inherent viscosity as determined in Example 2 of 1.63, and a differential scanning calorimetry glass transition temperature at 100° C. and a melt endotherm peak at 372° C. Monofilaments were spun while the molten polymer was at a temperature of 360° C. while employing a windup speed of 2000 meters/minute.

A section of the resulting as-spun polyester fiber had a denier of 1.75 and exhibited the following average single filament properties:
Tenacity (grams per denier): 4.4
Initial modulus (grams per denier): 460

Elongation (percent): 1.1

EXAMPLE 10

Example 2 was substantially repeated with the exceptions indicated. The following chemicals were added to the flask:
(a) 4.6 grams of 6-acetoxy-2-naphthoic acid (0.02 mole),
(b) 27.1 grams of 4-acetoxybenzoic acid (0.15 mole),
(c) 32.1 grams of hydroquinone diacetate (0.165 mole),
(d) 20.7 grams of isophthalic acid (0.1245 mole),
(e) 6.9 grams of terephthalic acid (0.0415 mole), and
(f) 0.005 gram of potassium acetate catalyst.

The resulting polymer exhibited an inherent viscosity as determined in Example 2 of 1.74, and a differential scanning calorimetry endotherm peak at 307° C. Monofilaments were spun while the molten polymer was at a temperature of 375° C. while employing a windup speed of 1234 meters/minute.

A section of the resulting as-spun polyester fiber had a denier of 3.4 and exhibited the following average single filament properties:
Tenacity (grams per denier): 5.4
Initial modulus (grams per denier): 306
Elongation (percent): 2.2
Following heat-treatment in the nitrogen atmosphere at 270° C. for 8 hours the fiber exhibited the following average single filament properties:
Tenacity (grams per denier): 12.7
Initial modulus (grams per denier): 370
Elongation (percent): 3.17

EXAMPLE 11

To a 2 liter flask equipped with a 316 stainless steel stirrer, gas inlet tube, and an 11 inch Vigreaux column with distillation head and receiver were added the following:
(a) 124.3 grams of 6-acetoxy-2-naphthoic acid (0.54 mole),
(b) 583.8 grams of 4-acetoxybenzoic acid (3.24 mole),
(c) 173 grams of hydroquinone diacetate (0.89 mole), or 10 percent excess,
(d) 67.3 grams of isophthalic acid (0.40 mole),
(e) 67.3 grams of terephthalic acid (0.40 mole, and
(f) 0.02 gram of potassium acetate catalyst. The flask was thoroughly purged of oxygen with nitrogen, and a slow purge of nitrogen of approximately 25 ml./minute was applied to the flask. The contents of the flask were initially heated to 240° C., from 240° to 300° C. over a period of two hours, and from 300° to 360° C. over a period of one hour. The temperature was first maintained at 360° C. for one-half hour, and then for another one-quarter hour at 360° C. while under 1 Torr. The vacuum was released, the product was allowed to cool, and was ground in a Wiley mill.

The resulting polymer exhibited an inherent viscosity of 5.61 as determined in Example 2, and a differential scanning calorimetry endotherm peak at 323° C.

The polymer next was dried for 16 hours at 130° C. and tensile and flexural test specimens were molded at 340° C. in an Arburg Model 221E/150 injection molding machine having an 18 mm. barrel. Standard tensile bars having a cross-section of 1/16 inch×⅛ inch were produced, and standard flexural bars having a cross-section of ⅛ inch×½ inch were produced. Tensile testing was conducted at room temperature using Type V tensile bars and an Instron testing unit according to ASTM D638. Flexural testing was conducted at room temperature according to ASTM D790. Izod impact testing was conducted according to ASTM D256. The following values were obtained:
Tensile Properties
Modulus: 2,600,000 psi
Strength: 25,000 psi
Elongation: 1.3 percent
Flexural Properties
Modulus: 1,500,000 psi
Strength: 22,300 psi
Izod Impact
3.3 ft.lb./in.

Although the invention has been described with preferred embodiments it is to be understood that variations and modifications may be employed without departing from the concept of the invention as defined in the following claims.

We claim:

1. A melt processable polyester capable of forming an anisotropic melt phase at a temperature below approximately 400° C. consisting essentially of the recurring moieties I, II, III, and IV wherein:

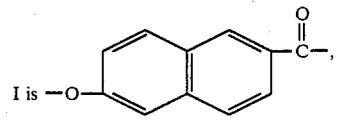

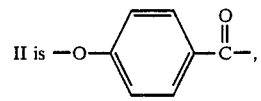

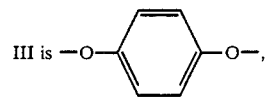

where the aromatic ring optionally may include substitution of at least some of the hydrogen atoms present thereon selected from the group consisting of an alkyl group of 1 to 4 carbon atoms, an alkoxy group of 1 to 4 carbon atoms, halogen, phenyl, and mixtures of the foregoing, and

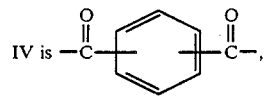

where the aromatic ring optionally may include substitution of at least some of the hydrogen atoms present thereon selected from the group consisting of an alkyl group of 1 to 4 carbon atoms, an alkoxy group of 1 to 4 carbon atoms, halogen, phenyl, and mixtures of the foregoing, and wherein approximately 40 to 90 mole percent of moiety IV is isophthaloyl moiety and approximately 10 to 60 mole percent of moiety IV is terephthaloyl moiety, and wherein said polyester comprises approximately 3 to 15 mole percent of moiety I, approximately 20 to 70 mole percent of moiety II, approximately 7.5 to 38.5 mole percent of moiety III, and approximately 7.5 to 38.5 mole percent of moiety IV.

2. A melt processable polyester according to claim 1 which is capable of forming an anisotropic melt phase at a temperature below approximately 370° C.

3. A melt processable polyester according to claim 1 which is capable of undergoing melt processing at a temperature in the range of approximately 320° to 390° C.

4. A melt processable polyester according to claim 1 which exhibits an inherent viscosity of at least 0.6 when dissolved in a concentration of 0.1 percent by weight in pentafluorophenol at 60° C.

5. A melt processable polyester according to claim 1 which exhibits an inherent viscosity of at least 1.0 when dissolved in a concentration of 0.1 percent by weight in pentafluorophenol at 60° C.

6. A fiber which has been melt spun from the polyester of claim 1.

7. A film which has been melt extruded from the polyester of claim 1.

8. A molded article comprising the melt processable polyester of claim 1.

9. A molding compound comprising the melt processable polyester of claim 1 which incorporates approximately 1 to 60 percent by weight of a solid filler and/or reinforcing agent.

10. A melt processable polyester capable of forming an anisotropic melt phase at a temperature below approximately 400° C. consisting essentially of the recurring moieties I, II, III and IV wherein:

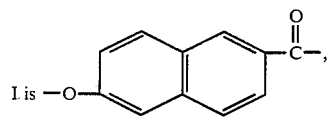

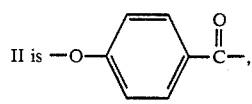

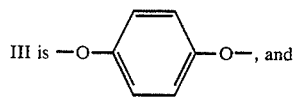

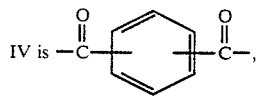

wherein approximately 40 to 90 mole percent of moiety IV is isophthaloyl moiety and approximately 10 to 60 mole percent of moiety IV is terephthaloyl moiety, and wherein said polyester comprises approximately 3 to 15 mole percent of moiety I, approximately 20 to 70 mole percent of moiety II, approximately 7.5 to 38.5 mole percent of moiety III, and approximately 7.5 to 38.5 mole percent of moiety IV.

11. A melt processable polyester according to claim 10 which is capable of forming an anisotropic melt phase at a temperature below approximately 370° C.

12. A melt processable polyester according to claim 10 which is capable of undergoing melt processing at a temperature in the range of approximately 320° to 390° C.

13. A melt processable polyester according to claim 10 which exhibits an inherent viscosity of at least 0.6 when dissolved in a concentration of 0.1 percent by weight in pentafluorophenol at 60° C.

14. A melt processeable polyester according to claim 10 which exhibits an inherent viscosity of at least 1.0 when dissolved in a concentration of 0.1 percent by weight in pentafluorophenol at 60° C.

15. A melt processable polyester according to claim 10 wherein moiety IV consists of approximately 50 to 75 mole percent of isophthaloyl moiety and approximately 25 to 50 mole percent of terephthaloyl moiety.

16. A melt processable polyester of claim 10 wherein moiety IV consists of approximately 50 mole percent of isophthaloyl moiety and approximately 50 mole percent of terephthaloyl moiety.

17. A melt processable polyester according to claim 10 which consists essentially of approximately 5 to 10 mole percent of moiety I, approximately 50 to 65 mole percent of moiety II, approximately 12.5 to 22.5 mole percent of moiety III, and approximately 12.5 to 22.5 mole percent of moiety IV.

18. A melt processable polyester according to claim 10 wherein the total molar concentration of moiety I plus the molar concentration of isophthaloyl moiety present in moiety IV does not exceed approximately 25 mole percent of said polyester.

19. A fiber which has been melt spun from the polyester of claim 10.

20. A film which has been melt extruded from the polyester of claim 10.

21. A molded article comprising the melt processable polyester of claim 10.

22. A molding compound comprising the melt processable polyester of claim 10 which incorporates approximately 1 to 60 percent by weight of a solid filler and/or reinforcing agent.

* * * * *